United States Patent Office 2,882,260
Patented Apr. 14, 1959

2,882,260

CROSSLINKED POLYMERS OF ETHYLENICALLY UNSATURATED BLOCKED ISOCYANATES

Herbert Bartl and Hans Holtschmidt, Koln-Stammheim, and Otto Bayer, Leverkusen-Bayerwerk, Germany, assignors to Farbenfabriken Bayer Aktiengesellschaft, Leverkusen, Germany, a corporation of Germany No Drawing. Application December 15, 1955
Serial No. 553,206

Claims priority, application Germany December 18, 1954

14 Claims. (Cl. 260—77.5)

This invention relates to a process for the production of plastics from unsaturated compounds containing blocked isocyanate groups.

It has already been proposed to copolymerize unsaturated isocyanates with other unsaturated organic compounds. Thus, copolymers are obtained which can be cross-linked with the aid of the reactive isocyanate groups contained therein to form plastics with advantageous properties. This copolymerization, however, can only be carried out in mass ("block" polymerization), or inert solvents since owing to the very reactive isocyanate groups, insoluble products are obtained when the reaction is carried out in the presence of water or solvents containing reactive hydrogen atoms. Moreover, the copolymers have the disadvantage of becoming insoluble when stored for a relatively long period because of cross-linking between their free isocyanate groups. Finally, the copolymers may react too quickly with compounds containing reactive hydrogen so that a controlled use of said copolymers is rendered difficult.

It is an object of the present invention to provide an improved process for the production of plastics from unsaturated isocyanates which obviates the disadvantages inherent in the known process. A further object is to provide a process for the production of plastics from unsaturated isocyanates which can be carried out in a convenient and economical manner. A further object is to provide a process for the production of plastics from unsaturated isocyanates which can be effected in an aqueous medium. Still further objects will appear hereinafter.

These objects are attained in accordance with the present invention by polymerizing with themselves or copolymerizing with other unsaturated polymerizable compounds at a temperature below 100° C., unsaturated polymerizable compounds containing blocked isocyanate groups, and heating the polymers or copolymers with blocked isocyanate groups thus obtained in the presence or absence of a cross-linking agent to a temperature of at least 100° C. to thereby effect cross-linking.

According to a preferred embodiment of the invention the first reaction step, i.e. the polymerization or copolymerization of the unsaturated polymerizable compound containing at least one blocked isocyanate group is carried out in an aqueous medium. In this suspension or emulsion, polymerization temperatures up to 100° C. may be employed for it has surprisingly been found that the polymerization of unsaturated compounds containing blocked isocyanate groups yields soluble polymers at temperatures up to 100° C. In the second reaction step, where the polymer or copolymer obtained in the first reaction step is heated in the presence or absence of a cross-linking agent to convert the blocked isocyanate groups into free isocyanate groups and to bring about cross-linking, either by reaction of the free isocyanate groups with one another or by reaction of the free isocyanate groups with the cross-linking agent, temperatures ranging from about 100° to 200° C. have been found to be particularly satisfactory.

Unsaturated polymerizable compounds containing blocked isocyanate groups, which may be used in the practice of the invention, include the addition compounds of unsaturated polymerizable isocyanates, such as acrylic acid ester isocyanates, allyl ether isocyanates, styryl isocyanate or vinyl isocyanate, with phenols, tertiary alcohols, hydrocyanic acid or with compounds having activated methylene groups, such as for example malonic ester or acetoacetic ester. The blocked isocyanate groups contained in these addition compounds are converted into free isocyanate groups by heating to temperatures above 100° C.

Such addition compounds containing blocked isocyanate groups can be produced in known manner from the above-mentioned components. Suitable unsaturated polymerizable compounds containing blocked isocyanate groups are also obtained by reacting the hydrochlorides of unsaturated primary amines with chlorocarbonic acid esters of phenols or tertiary alcohols in the presence of a basic compound.

Unsaturated polymerizable compounds containing blocked isocyanate groups, which are particularly suitable for use as starting materials, are certain derivatives of acrylic and methacrylic acid esters, such as the phenylurethane derivatives of said acid esters. These compounds are readily polymerizable and can be copolymerized with other unsaturated compounds in the same proportions and under the same reaction conditions as the simple acrylic and methacrylic acid esters.

Unsaturated compounds which may be copolymerized with the above-mentioned unsaturated polymerizable compounds containing blocked isocyanate groups in accordance with the present invention, include the esters of acrylic acid, methacrylic acid, fumaric acid or maleic acid, acrylonitrile, N-substituted acrylamides, styrene, α-methyl styrene and other substituted styrenes, butadiene, chlorobutadiene, vinyl ether, vinyl ester and other vinyl compounds.

The polymerization or copolymerization of the unsaturated polymerizable compounds containing blocked isocyanate groups which serve as starting materials for the process of the invention is preferably carried out in an aqueous medium, but the reaction may also be effected in mass ("block" polymerization) or in an organic solvent. As already mentioned, polymerization temperatures up to about 100° C. may be employed without running the risk of the blocked isocyanate groups splitting up and the isocyanate groups so liberated leading to undesirable side reactions. The polymerization or copolymerization is advantageously initiated by adding a conventional radical-forming catalyst, such as potassium persulfate, organic hydroperoxides and peroxides and azo diisobutyric acid nitrile. In some instances it is advisable to use the radical-forming catalyst in combination with a reducing agent as an activator, e.g. organic sulfinic acids, glucose, fructose, ascorbic acid or triethanolamine. When operating in an aqueous medium, it is preferred to stabilize the emulsion or suspension of the reactants by the addition of a minor amount of a surface active agent, such as alkylsulfonates, alkylarylsulfonates, polyethylene ethers or soaps.

Cross-linking agents which may be used in the second reaction step to convert the polymers obtained in the first reaction step into the cross-linked plastics of the invention are compounds containing at least two reactive hydrogen atoms, such as amines, alcohols and organic acids. It is also possible to utilize as cross-linking agents fillers or plasticizers containing reactive hydrogen, representative examples of such fillers being alkyd resins, condensates containing methylol groups, polyvinyl alcohol, partially esterified cellulose, casein and others.

The cross-linking reaction can be accelerated by catalysts commonly used in this type of reaction, such as tertiary amines. Although cross-linking in the presence of catalysts may already take place at slightly elevated temperature, the reaction is preferably carried out at temperatures ranging from about 100° to 200° C. as stated above.

If in the first reaction step an unsaturated polymerizable compound containing a blocked isocyanate group is copolymerized with an unsaturated polymerizable compound containing reactive hydrogen, polymers are obtained which in the second reaction step yield cross-linked plastics owing to a reaction between the reactive hydrogen atoms contained in the unsaturated polymerizable component with the free isocyanate groups formed by heating the polymer with blocked isocyanate groups. Reseentative examples of unsaturated polymerizable compounds containing reactive hydrogen atoms include acryl amide, acrylic acid, methacrylic acid and acid esters of maleic and fumaric acid. In the copolymerization with these unsaturated polymerizable compounds containing reactive hydrogen atoms, the unsaturated polymerizable compounds containing blocked isocyanate groups are preferably used in amounts of 1 to 10% by weight, based on the weight of the mixture.

The cross-linked plastics of the instant invention are characterized by a high stability to solvents and by good mechanical properties. Most of the cross-linked plastics of the invention have a relatively high softening point which makes it possible to remove molded elements made of the plasitcs of the invention from the molds at comparatively high temperatures.

The novel plastics obtainable by the process of the invention can be used for many purposes. Thus, they are suitable for making moldings, coatings, lacquers, foils, filaments, fibers, elastic materials and impregnations of textiles.

The invention is further illustrated but not limited by the following examples, the parts given being parts by weight.

Example 1

4 parts of methacrylic acid ethyl ester phenyl urethane $(CH_2=C.(CH_3).COOC_2H_4.NHCOOC_6H_5)$ and also 0.5 part of lauroyl peroxide are dissolved in 96 parts of methyl methacrylate. The monomer mixture is suspended in 300 parts by volume of water in which 0.4 part of polyvinyl alcohol is dissolved as suspension stabilizer. Polymerization takes place for 6 hours at 70° C. with vigorous stirring. The polymer is formed as fine beads which are filtered off, washed and dried. The polymer is soluble in butyl acetate. The beads can be compressed together with 5 parts of trimethylol propane at about 160° C., a cross-linked product being formed; films manufactured from butyl acetate solutions with addition of trimethylol propane can be made insoluble by heating to about 100° C.

Example 2

94 parts of vinyl chloride, 6 parts of acrylic acid ethyl ester phenyl urethane $(CH_2=CHCOOC_2H_4.NHCOOC_6H_5)$ and 250 parts by volume of water are mixed by stirring in an autoclave until the crystalline phenyl urethane is dissolved. 50 parts of a 10% solution of the sodium salt of a sulfonated paraffin hydrocarbon with 12–14 carbon atoms and also 0.2 part of potassium persulfate are then added. The mixture is polymerized for 24 hours at 40° C. A homogeneous emulsion is formed which is coagulated with a saturated common salt solution. The washed and dried polymer is soluble in methyl ethyl ketone and can be cross-linked by heating at 150° C. with 30%, based on the vinyl chloride copolymer, of a copolymer of butadiene, acrylonitrile and acrylic acid hydroxy ethyl ester, if necessary in the presence of plasticizers.

Example 3

5 parts of acrylic acid ethyl ester phenyl urethane and also 0.5 part of benzoyl peroxide are dissolved in 95 parts of styrene and suspended in 300 parts by volume of water in which 0.4 part of polyvinyl alcohol is dissolved as suspension stabilizer. Polymerization is carried out in 24 hours at 90° C. while stirring vigorously. Fine beads are formed which are washed and dried, the beads are soluble in chlorobenzene. The product can be mixed with 5 parts of hexanediol and molded at 150° C. in molds, cross-linked molded elements being formed.

Example 4

2.5 parts of acrylic acid ethyl ester phenyl urethane are dissolved in 45 parts of acrylonitrile and 2.5 parts of vinyl acetate and mixed by intensive stirring with 350 parts by volume of water in which are dissolved 1 part of potassium persulfate and 1.2 parts of triethanolamine; the mixture is polymerized for 24 hours at 30° C. The granular polymer dissolves satisfactorily in dimethyl formamide and can be spun. It can be cross-linked during the spinning or by after-treatment with diamines.

Example 5

75 parts of acrylic acid ethyl ester phenyl urethane are dissolved in 525 parts of acrylonitrile. The solution and 900 parts of butadiene are introduced into a stirrer-type autoclave containing 1.500 parts by volume of water, 60 parts of the sodium salt of a sulfonated paraffin hydrocarbon with 12 to 14 carbon atoms, 3 parts of the sodium salt of a paraffin sulfinic acid with 12 to 14 carbon atoms, 45 parts by volume of normal sulfuric acid and also 1.5 parts of diisopropyl xanthogen disulfide. The mixture is polymerized at 25° C. in the presence of air inside the autoclave while stirring and a further 4.5 parts of diisopropyl xanthogen disulfide are added during the polymerization. As soon as 70% of the monomers are polymerized, the mixture is neutralized with caustic soda solution and a suspension of 30 parts of 2,2'-methylene-bis-4-methyl-6-cyclohexyl-phenol as stabilizer are mixed therein by stirring. The emulsion is coagulated by means of a saturated common salt solution. The polymer is very suitable for being worked and molded. After adding fillers and a diamine, for example 4%, based on the polymer, of ethylene diamine or 6% of hexamethylene diamine, and heating under pressure to 130° C. products having rubber-like elastic properties are obtained.

Example 6

5 parts of acrylic acid ethyl ester phenyl urethane and 0.5 part of benzoyl peroxide are dissolved in 90 parts of styrene and 5 parts of the acid butyl ester of maleic acid and suspended in 300 parts by volume of water in which 0.4 part of polyvinyl alcohol is dissolved as suspension stabilizer. The mixture is polymerized for 24 hours at 90° C. while stirring vigorously. The fine beads obtained are pressed in molds at 150° C. highly cross-linked molded elements being formed.

The above description and examples are intended to be illustrative only. Any modification or variation therefrom which conforms to the spirit of the invention is intended to be included within the scope of the claims.

What is claimed is:

1. Process for preparing plastics which comprises copolymerizing in an aqueous acid medium acrylic acid ethyl ester phenyl urethane with acrylonitrile and butadiene in the presence of air, the sodium salt of a sulfonated paraffin hydrocarbon with 12 to 14 carbon atoms, the sodium salt of a paraffin sulfinic acid with 12 to 14 carbon atoms and diisopropyl xanthogen disulfide, recovering a copolymer from the reaction mixture, and heating said copolymer with a filler and a diamine at a temperature of at least 100° C. to thereby form a cross-linked plastic.

2. A method for making high molecular weight polymers which comprises polymerizing at a temperature below 100° C. and in the presence of a free radical catalyst a compound selected from the group consisting of compounds having the formula

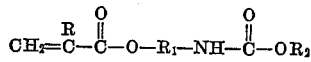

and compounds having the formula

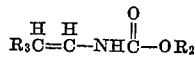

wherein R is selected from the group consisting of hydrogen and an alkyl group; $R_1$ is an alkylene radical; $R_2$ is a radical obtained by removing an hydroxyl radical from a compound selected from the group consisting of a phenol and a tertiary alcohol; $R_3$ is selected from the group consisting of hydrogen and a radical obtained by removing a hydrogen from a benzene ring; and thereafter maintaining the resulting polymer at a temperature of at least 100° C. to produce free NCO groups and a cross-linked polymer.

3. A method for making high molecular weight polymers which comprises polymerizing at a temperature below 100° C. and in the presence of a free radical catalyst a compound having the formula

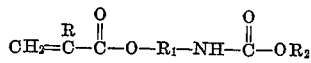

wherein R is selected from the group consisting of hydrogen and an alkyl group; $R_1$ is an alkylene radical; $R_2$ is a radical obtained by removing an hydroxyl radical from a compound selected from the group consisting of a phenol and a tertiary alcohol; and thereafter maintaining the resulting polymer at a temperature of at least 100° C. to produce free NCO groups and a cross-linked polymer.

4. A method for making high molecular weight polymers which comprises polymerizing at a temperature below 100° C. and in the presence of a free radical catalyst a compound selected from the group consisting of compounds having the formula

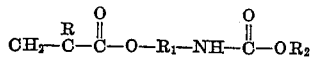

and compounds having the formula

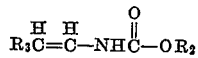

wherein R is selected from the group consisting of hydrogen and an alkyl group; $R_1$ is an alkylene radical; $R_2$ is a radical obtained by removing an hydroxyl radical from a compound selected from the group consisting of a phenol and a tertiary alcohol; $R_3$ is selected from the group consisting of hydrogen and a radical obtained by removing a hydrogen atom from a benzene ring; and thereafter maintaining the resulting polymer and a cross-linking agent selected from the group consisting of a trihydric alcohol, a glycol and an alkylene diamine at a temperature of at least 100° C. to produce free isocyanate groups and a cross-linked polymer.

5. A method for making high molecular weight polymers which comprises copolymerizing at a temperature below 100° C. and in the presence of a free radical catalyst a compound selected from the group consisting of compounds having the formula

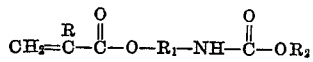

and compounds having the formula

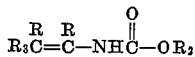

wherein R is selected from the group consisting of hydrogen and an alkyl group; $R_1$ is an alkylene radical; $R_2$ is a radical obtained by removing an hydroxyl radical from a compound selected from the group consisting of a phenol and a tertiary alcohol; $R_3$ is selected from the group consisting of hydrogen and a radical obtained by removing a hydrogen atom from a benzene ring; with a compound selected from the group consisting of lower alkyl esters of acrylic acid, lower alkyl esters of methacrylic acid, lower alkyl esters of maleic acid, acrylonitrile, styrene, methyl styrene, vinyl chloride, vinyl acetate, butadiene and chlorobutadiene, and thereafter maintaining the resulting polymer at a temperature of at least 100° C. to produce NCO groups and a cross-linked polymer.

6. A method for making high molecular weight polymers which comprises copolymerizing at a temperature below 100° C. and in the presence of a free radical catalyst a compound having the formula

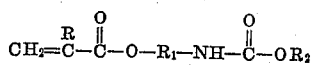

wherein R is selected from the group consisting of hydrogen and an alkyl group; $R_1$ is an alkylene radical; $R_2$ is a radical obtained by removing an hydroxyl radical from a compound selected from the group consisting of a phenol and a tertiary alcohol; with a compound selected from the group consisting of lower alkyl esters of acrylic acid, lower alkyl esters of methacrylic acid, lower alkyl esters of maleic acid, acrylonitrile, styrene, methyl styrene, vinyl chloride, vinyl acetate, butadiene and chlorobutadiene, and thereafter maintaining the resulting polymer at a temperature of at least 100° C. to produce NCO groups and a cross-linked polymer.

7. A method for making high molecular weight polymers which comprises copolymerizing at a temperature below 100° C. and in the presence of a free radical catalyst a compound selected from the group consisting of compounds having the formula

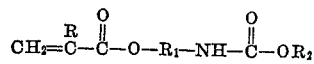

and compounds having the formula

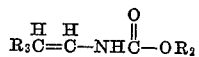

wherein R is selected from the group consisting of hydrogen and an alkyl group; $R_1$ is an alkylene radical; $R_2$ is a radical obtained by removing an hydroxyl radical from a compound selected from the group consisting of a phenol and a tertiary alcohol; $R_3$ is selected from the group consisting of hydrogen and a radical obtained by removing a hydrogen atom from a benzene ring; with a compound selected from the group consisting of lower alkyl esters of acrylic acid, lower alkyl esters of methacrylic acid, lower alkyl esters of maleic acid, acrylonitrile, styrene, methyl styrene, vinyl chloride, vinyl acetate, butadiene and chlorobutadiene, and thereafter maintaining the resulting polymer and a cross-linking agent selected from the group consisting of a trihydric alcohol, a glycol and an alkylene diamine at a temperature of at least 100° C. to produce free isocyanate groups and a cross-linked polymer.

8. The process of claim 2 wherein said polymerization below 100° C. is carried out in an aqueous medium.

9. The process of claim 5 wherein said copolymerization below 100° C. is carried out in an aqueous medium.

10. A method for making high molecular weight polymers which comprises copolymerizing at a temperature below 100° C. in an aqueous medium methacrylic acid ethyl ester phenyl urethane with methyl methacrylate in the presence of lauroyl peroxide, and maintaining the resulting copolymer in admixture with trimethylol propane at a temperature of at least 100° C. to form a cross-linked polymer.

11. A method for making high molecular weight polymers which comprises copolymerizing at a temperature below 100° C. in an aqueous medium and in the presence of potassium persulfate and the sodium salt of a sulfonated paraffin hydrocarbon having 12 to 14 carbon atoms an acrylic acid alkyl phenyl urethane and vinyl chloride, and maintaining the resulting copolymer in admixture with a cross-linking agent selected from the group consisting of a trihydric alcohol, a glycol and an alkylene diamine at a temperature of at least 100° C. to form a cross-linked polymer.

12. A method for making high molecular weight polymers which comprises copolymerizing in an aqueous medium at a temperature below 100° C. acrylic acid ethyl ester phenyl urethane with styrene in the presence of benzoyl peroxide, and maintaining the resulting copolymer in admixture with hexanediol at a temperature of at least 100° C. to form a cross-linked polymer.

13. A method for making high molecular weight polymers which comprises copolymerizing in an aqueous medium at a temperature below 100° C. acrylic acid ethyl ester phenyl urethane with acrylonitrile and vinyl acetate in the presence of potassium persulfate, and maintaining the resulting copolymer in admixture with an alkylene diamine at a temperature of at least 100° C. to form a cross-linked polymer.

14. A method for preparing plastics which comprises copolymerizing in an aqueous medium at a temperature below 100° C. acrylic acid ethyl ester phenyl urethane with styrene and the acid butyl ester of maleic acid in the presence of a free radical catalyst, and maintaining the resulting copolymer at a temperature of at least 100° C. to form free NCO groups and a cross-linked polymer.

References Cited in the file of this patent

UNITED STATES PATENTS

| | | |
|---|---|---|
| 2,647,884 | Wystrach | Aug. 4, 1953 |
| 2,718,516 | Bortnick | Sept. 20, 1955 |

OTHER REFERENCES

Bayer: "Angewandte Chemie," pages 257–272, Ausgabe 59, Jahrgang Nr. 9, September 1947. (Copy in Scientific Lib.)